US 3,465,010
Patented Sept. 2, 1969

3,465,010
17 - (UNSATURATED HYDROCARBON - SUBSTITUTED) 11,13β - DIALKYLGON - 4 - ENE - 3,17β-DIOLS AND ESTERS THEREOF
John S. Baran, Morton Grove, Ill., assignor to G. D. Searle & Co., Chicago, Ill., a corporation of Delaware
No Drawing. Filed Nov. 22, 1966, Ser. No. 596,090
Int. Cl. C07c 169/08, 169/12; A61k 17/00
U.S. Cl. 260—397.5         8 Claims

ABSTRACT OF THE DISCLOSURE 17-(unsaturated hydrocarbon-substituted) 11,-13β-dialkylgon-4-ene-3,17β-diols manufactured by reaction of the corresponding 3-keto starting materials with a suitable reducing agent and the esters of those diols display useful pharmacological properties, e.g., progestational and deciduogenic.

---

The present invention is concerned with novel organic chemical compounds of the steroid family in which there is invariably present an 11-alkyl substituent. More particularly, these compounds are 17-(unsaturated hydrocarbon-substituted) 11,13β-dialkylgon-4-ene-3,17β-diols and the corresponding esters which are represented by the following structural formula

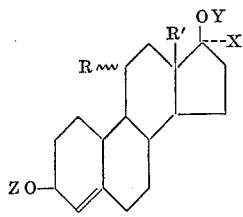

In that structural representation, R and R' are lower alkyl radicals, X denotes a lower unsaturated aliphatic hydrocarbon radical, Y and Z can be either hydrogen or a lower alkanoyl radical and the wavy line indicates the alternative α or β stereochemical configuration.

The lower alkyl radicals symbolized by R and R' are exemplified by methyl, ethyl, propyl, butyl, pentyl, hexyl, heptyl and the branched-chain radicals isomeric therewith.

Typical of the lower alkanoyl radicals signified by the Y and Z terms are formyl, acetyl, propionyl, butyryl, valeryl, caproyl, heptanoyl and the branched-chain isomers thereof.

The lower unsaturated aliphatic hydrocarbon radicals denoted by X are typified by ethynyl, vinyl, propynyl, allyl, butynyl, propargyl, methallyl, etc.

Manufacture of the compounds of the present invention is conveniently achieved by processes which utilize as starting materials compounds of the following structural formula

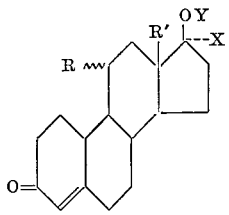

wherein X, Y, R and R' are as hereinbefore defined. Those starting materials together with methods for their manufacture are described in my copending application Ser. No. 512,539, filed Dec. 8, 1965, now U.S. Patent No. 3,325,520. When the latter substances are contacted with a suitable reducing agent, preferably a metallic hydride such as lithium aluminum hydride, sodium borohydride, potassium borohydride, lithium tri-(tertiary-butoxy) aluminum hydride or diisobutyl aluminum hydride, conversion of the 3-keto to a 3-hydroxy function occurs. That process is carried out typically at room temperature, preferably in the presence of a suitable inert organic solvent. As a specific example, the reaction of 17α-ethynyl-17β-hydroxy-11β-methylestr-4-en-3-one with lithium tri-(tertiary-butoxy) aluminum hydride in tetrahydrofuran at room temperature results in 17α-ethynyl-11β-methylestr-4-ene-3β-17β-diol.

Esterification of the instant 3-hydroxy substances by reaction with a lower alkanoic acid anhydride or halide at room temperature, preferably in the presence of a suitable acid acceptor, in the case of the instant 3,17-diols results in the corresponding 3-mono-(lower alkanoates) and, in the case of the instant 17-mono-(lower alkanoates), affords the instant 3,17-bis-(lower alkanoates). Specific examples of that process are the reaction of 17α-ethynyl-11β-methylestr-4-ene-3β,17β-diol or 17α - ethynyl - 11β-methylestr-4-ene-3β,17β-diol-17-acetate with acetic anhydride and pyridine at room temperature to afford 17α-ethynyl - 11β-methylestr-4-ene-3β,17β-diol 3-acetate and 17α-ethynyl-11β-methylestr-4-ene-3β,17β-diol 3,17 - diacetate, respectively.

The instant 3,17-bis-(lower alkanoates) are produced also by acylation of the corresponding 3,17-diols at elevated temperature. The aforementioned 17α-ethynyl-11β-methylestr-4-ene-3β,17β-diol is thus heated at 90–100° for about 18 hours with acetic anhydride and pyridine to afford 17α-ethynyl-11β-methylestr-4-ene-3β,17β-diol 3,17-diacetate.

The instant compounds wherein the 13β-alkyl group contains more than one carbon atom are obtained as dl mixtures. Resolution of these dl compounds to afford the individual d and l enantiomorphs is conveniently effected by esterification of the hydroxy group with a dibasic anhydride such as succinic or phthalic anhydride to afford the corresponding acid ester, which is resolved by means of an optically active amine such as brucine, morphine, quinine, quinidine, strychnine, etc.

The compounds of the present invention are useful in consequence of their valuable pharmacological properties. In particular, they are hormonal agents as is evidenced by their potent progestational and deciduogenic activity.

The invention will appear more fully from the examples which follow. These examples are given by way of illustration only and are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight unless otherwise noted.

Example 1

To a solution of one part of 17α-ethynyl-17β-hydroxy-11β-methylestr-4-en-3-one in 27 parts of tetrahydrofuran is added 4 parts of lithium tri(tertiary-butoxy) aluminum hydride, and the resulting reaction mixture is stirred at room temperature for about 2 hours. The mixture is then poured with stirring into an aqueous mixture containing 40 parts of water, 20 parts of ice and 10.5 parts of acetic acid. Extraction with chloroform affords an organic solution, which is washed successively with aqueous sodium chloride and aqueous sodium bicarbonate, then dried over anhydrous magnesium sulfate and distilled to dryness under reduced pressure. The resulting crude product is purified by recrystallization from etherhexane to yield 17α-ethynyl-11β-methylestr-4-ene-3β,17β-diol, melting at about 175–180°. This compound exhibits infrared absorption maxima, in a potassium bromide disc, at about 2.82, 2.90, 3.06, 7.21, 9.34, 9.67, and 9.98 microns and nuclear magnetic resonance peaks at about 58, 67, 154, 250 and 325 cycles per second. It is represented by the following structural formula

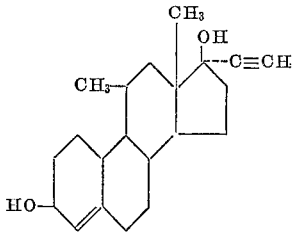

Example 2

A mixture containing one part of 17α-ethynyl-11β-methylestr-4-ene-3β,17β-diol, 5 parts of acetic anhydride and 10 parts of pyridine is heated on the steam bath for about 18 hours, then is cooled and concentrated to dryness under reduced pressure. The resulting solid residue is extracted with ether, and the ether solution is washed several times with saturated aqueous sodium chloride, then dried over anhydrous magnesium sulfate and concentrated to dryness under reduced pressure. Purification by recrystallization from methanol affords pure 17α-ethynyl - 11β - methylestr - 4 - ene - 3β,17β - diol 3,17-diacetate, melting at about 148°. This compound is represented by the following structural formula

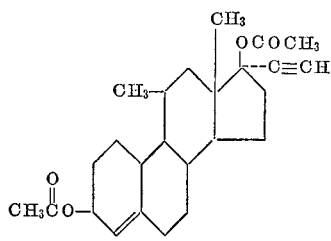

Example 3

By substituting an equivalent quantity of propionic anhydride and otherwise proceeding according to the processes described in Example 2, there is obtained 17α-ethynyl - 11β - methylestr - 4 - ene - 3β,17β - diol 3,17-dipropionate.

Example 4

When an equivalent quantity of dl-17α-ethynyl-13β-ethyl-17β-hydroxy-11β-methylgon-4-en - 3 - one is substituted in the procedure of Example 1, there is produced dl - 17α - ethynyl - 13β - ethyl - 11β - methylgon - 4 - ene- 3β,17β-diol.

Example 5

By substituting an equivalent quantity of dl-17α-ethynyl - 13β - ethyl - 11β - methylgon - 4 - ene - 3β,17β-diol and otherwise proceeding according to the processes described in Example 2, there is obtained dl-17α-ethynyl-13β - ethyl - 11β - methylgon - 4 - ene - 3β,17β - diol, 3,17-diacetate.

Example 6

The reduction of an equivalent quantity of 11β-ethyl-17α-ethynyl-17β-hydroxyestr-4-ene-3-one by the procedure described in Example 1 results in 11β-ethyl-17α-ethynyl-estr-4-ene-3β,17β-diol.

Example 7

The acylation of an equivalent quantity of 11β-ethyl-17α-ethynylestr-4-ene-3β,17β-diol by the procedure described in Example 2 results in 11β-ethyl-17α-ethynylestr-4-ene-3β,17β-diol, 3,17-diacetate.

Example 8

When an equivalent quantity of 17β-hydroxy-11β-methyl-17α-vinylestr-4-en-3-one is reduced by the procedure described in Example 1, there is obtained 11β-methyl-17α-vinylestr-4-ene-3β,17β-diol.

Example 9

The reaction of an equivalent quantity of 11β-methyl-17α-vinylestr-4-ene-3β,17β-diol with acetic anhydride according to the procedure described in Example 2 results in 11β-methyl-17α-vinylestr-4-ene-3β,17β-diol 3,17-diacetate.

Example 10

With an equivalent quantity of 17β-hydroxy-11β-methyl-17α-propynylestr-4-en-3-one is substituted in the procedure of Example 1, there is produced 11β-methyl-17α-propynylester-4-ene-3β,17β-diol.

Example 11

The reaction of an equivalent quantity of 11β-methyl-17α-propynylestr-4-ene-3β,17β-diol with acetic anhydride by the procedure described in Example 2 results in 11β-methyl - 17α - propynylestr - 4 - ene - 3β,17β - diol 3,17-diacetate.

Example 12

By substituting an equivalent quantity of 17β-hydroxy-11β - methyl - 17α - propenylestr - 4 - en - 3 - one and otherwise proceeding according to the processes described in Example 1, there is produced 11β-methyl-17α-propenylestr-4-ene-3β,17β-diol.

Example 13

The substitution of an equivalent quantity of 11β-methyl - 17α - propenylestr-4-ene-3β,17β - diol in the procedure of Example 2 results in 11β-methyl-17α-propenylestr-4-ene-3β,17β-diol 3,17-diacetate.

Example 14

To a solution containing 70 parts of liquid ammonia, 45 parts of tetrahydrofuran and 5.6 parts of tertiary-butyl alcohol is added a solution of 1 part of 3-methoxy-11α-methylestra-1,3,5(10)-trien-17-one in 18 parts of tetrahydrofuran, and the resulting reaction mixture is stirred while 0.5 part of sodium is added over a period of about 40 minutes. At the end of that time, the blue color is destroyed by the addition of approximately 8 parts of methanol, and the solution is evaporated to dryness under reduced pressure. Trituration of the residual solid material with ice water affords 11α-methylestra-2,5(10)-diene-3,17β-diol 3-methyl ether.

A solution containing 8 parts of 11α-methylestra-2,5 (10)-diene-3,17β-diol 3-methyl ether, 870 parts of toluene, 20 parts of aluminum isopropoxide and 47.5 parts of cyclohexanone is heated at the reflux temperature for about one hour, then cooled, following which time 500 parts by volume of saturated aqueous sodium potassium tartrate is added. The volatile organic material is removed by steam distillation and the resulting aqueous residue is cooled and extracted with ether. Drying of the ether extract over anhydrous magnesium sulfate followed by concentration of the solution to dryness affords a residue, which is treated with hexane to afford 3-methoxy-11α-methylestra-2,5(10)-dien-17-one.

A mixture of 1 part of 3-methoxy-11α-methylestra-2,5 (10)-dien-17-one, 25 parts of the 30% lithium acetylide-70% ethylene diamine complex and 450 parts of tetrahydrofuran is stirred in a nitrogen atmosphere at about 0° for approximately 2½ hours, then is diluted with approximately 500 parts of water. The resulting mixture is partially concentrated under reduced pressure, then is extracted with ether. The ether extract is washed with dilute aqueous sodium chloride, then is dried over anhydrous magnesium sulfate and concentrated to dryness under reduced pressure. The residue which contains 17α-ethynyl-11α-methylestra-2,5(10)-dien-3,17β-diol 3-methyl ether is dissolved in 80 parts of methanol, and a solution of 20 parts of 4 N hydrochloric acid in 20 parts of water is added. That solution is heated on the steam bath for about 10 minutes, then is cooled and neutralized by the addition of aqueous sodium bicarbonate. Concentration of that solution to dryness affords the crude product, which is treated with decolorizing carbon to yield 17α-ethynyl-17β-hydroxy-11α-methylestr-4-en-3-one.

The substitution of an equivalent quantity of 17α-ethynyl-17β-hydroxy-11α-methylestr-4-en-3-one in the procedure described in Example 1 results in 17α-ethynyl-11α-methylestr-4-ene-3β,17β-diol.

Example 15

When an equivalent quantity of 17α-ethynyl-11α-methylestr-4-ene-3β,17β-diol is substituted in the procedure of Example 2, there is produced 17α-ethynyl-11α-methylestr-4-ene-3β,17β-diol 3,17-diacetate.

Example 16

A solution of 4 parts of 17α-ethynyl-17β-hydroxy-11α-methylestr-4-en-one in 200 parts of pyridine is shaken with 0.4 part of 5% palladium-on-carbon catalyst at atmospheric pressure and room temperature until one molecular equivalent of hydrogen is absorbed. The catalyst is removed by filtration, and the filtrate is evaporated to dryness at reduced pressure to afford 17β-hydroxy-11α-methyl-17α-vinylestr-4-en-3-one.

By substituting an equivalent quantity of 17β-hydroxy-11α-methyl-17α-vinylestr-4-en-3-one and otherwise proceeding according to the processes described in Example 1 there is obtained 11α-methyl-17α-vinylestr-4-ene-3β,17β-diol.

Example 17

When an equivalent quantity of 11α-methyl-17α-vinylestr-4-ene-3β,17β-diol is acylated by the procedure described in Example 2, there is obtained 11α-methyl-17α-vinylestr-4-ene-3β,17β-diol 3,17-diacetate.

What is claimed is:

1. A compound of the formula

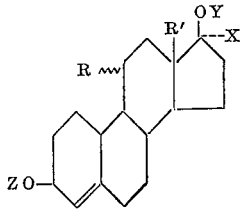

wherein X is a lower aliphatic unsaturated hydrocarbon radical, Y and Z are selected from the group consisting of hydrogen and a lower alkanoyl radical and R and R' are lower alkyl radicals.

2. As in claim 1, a compound of the formula

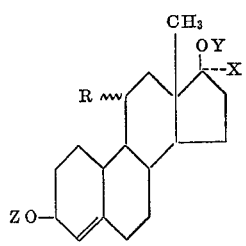

wherein X is a lower aliphatic unsaturated hydrocarbon radical, Y and Z are selected from the group consisting of hydrogen and a lower alkanoyl radical and R is a lower alkyl radical.

3. As in claim 1, a compound of the formula

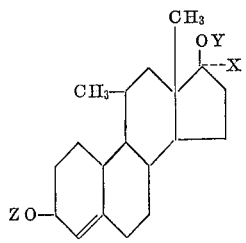

wherein X is a lower aliphatic unsaturated hydrocarbon radical and Y and Z are selected from the group consisting of hydrogen and a lower alkanoyl radical.

4. As in claim 1, a compound of the formula

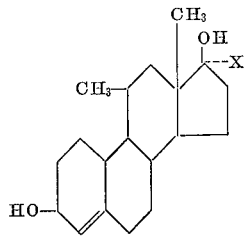

wherein X is a lower aliphatic unsaturated hydrocarbon radical.

5. As in claim 1, a compound of the formula

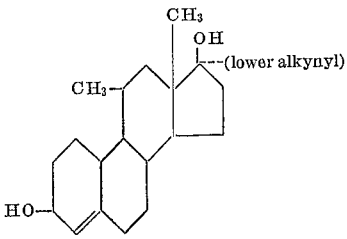

6. As in claim 1, a compound of the formula

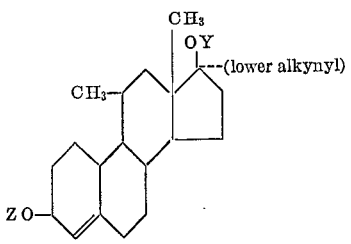

wherein Y and Z are lower alkanoyl radicals.

7. As in claim 1, the compound which is 17α-ethynyl-11β-methylestr-4-ene-3β,17β-diol.

8. As in claim 1, the compound which is 17α-ethynyl-11β-methylestr-4-ene-3β,17β-diol 3,17-diacetate.

References Cited

UNITED STATES PATENTS 3,346,602   10/1967   Baran _____ 260—397.45
2,843,609   7/1958    Colton.
3,176,013   3/1965    Klimstra.

LEWIS GOTTS, Primary Examiner.

E. G. LOVE, Assistant Examiner

U.S. Cl. X.R.

260—397.45, 999